July 12, 1932. A. N. BENN 1,866,793
SMOKEHOUSE TROLLEY
Filed June 17, 1929 2 Sheets-Sheet 2

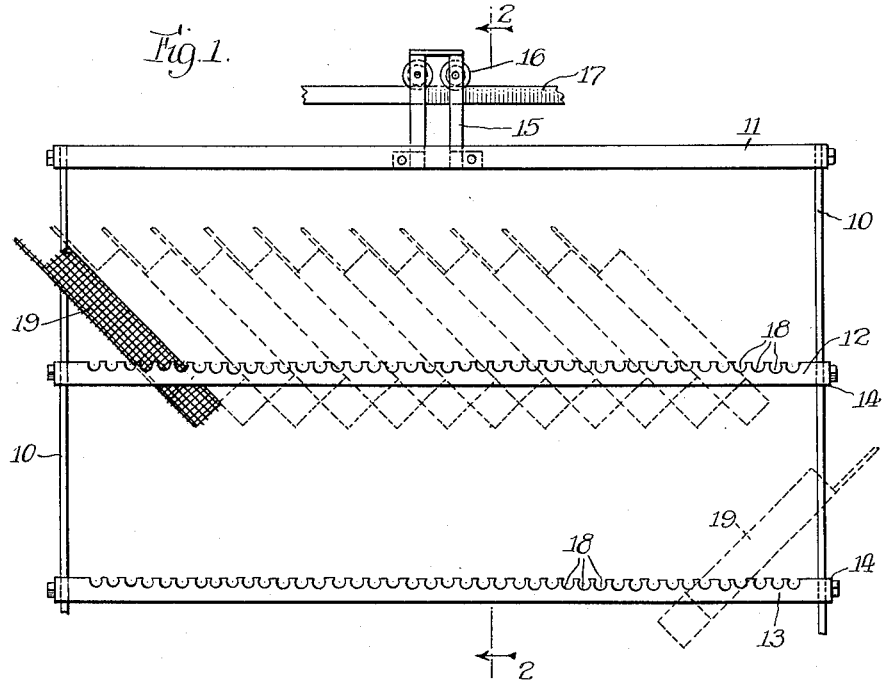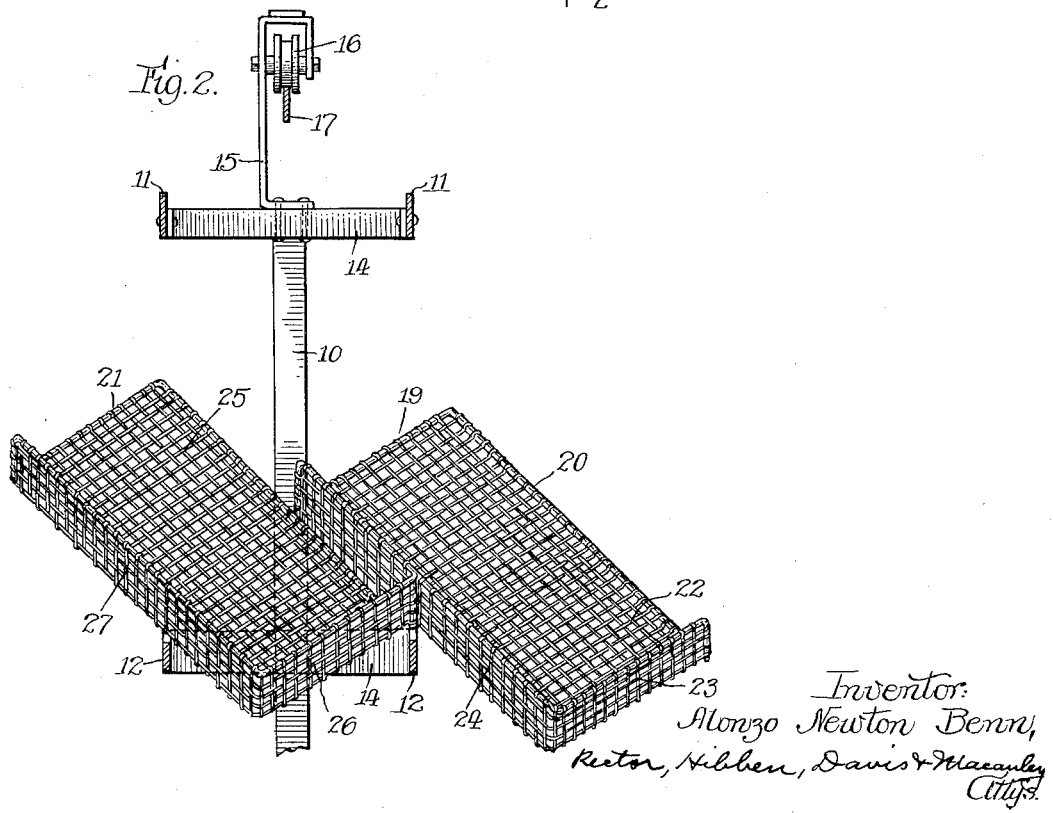

Inventor:
Alonzo Newton Benn,
Rector, Hibben, Davis & Macauley
Attys.

Patented July 12, 1932

1,866,793

UNITED STATES PATENT OFFICE

ALONZO NEWTON BENN, OF CHICAGO, ILLINOIS

SMOKEHOUSE TROLLEY

Application filed June 17, 1929. Serial No. 371,339.

My invention relates to a smokehouse trolley.

The principal object of my invention is to devise an arrangement in a smokehouse trolley for the carriage of meat during the smoking thereof, particularly bacon, which permits a positive, initial shaping of the meat and subsequent control thereof during the smoking process so that the final product presents a more attractive and marketable form.

A further object is to provide an improved type of basket for carrying the meat and simple, highly effective devices operating therewith which initially constrain the meat into the form desired and maintain the latter during a smoking operation.

A further object is to devise a method of loading a smokehouse trolley whereby the meat is carried in a manner to effect a marked improvement in appearance and shape over that obtainable when the meat is simply suspended on hooks, and in which the load capacity of the trolley approximates that of a trolley arranged for the hook method of smoking.

The present invention is intended as an improvement on the trolley illustrated and described in my United States Letters Patent No. 1,653,539, dated December 20, 1927, principally in the way of simplification in structure and manner of handling, and improving the capacity of the trolley. As stated in the patent, the method of supporting meat in smokehouse trolleys in which the same is hung upon hooks which are mounted on the trolley frame is decidedly objectionable. The necessity of forcing the meat on the hooks creates holes therethrough which become elongated under the action of gravity according to different degrees with consequent distortion in the shape of the meat and the creation of an irregular outline thereof, allowing uneven contractions and displacements to take place between the fatty and lean portions of the meat. In addition to the misshapen appearance of bacon smoked according to this method, the holes established by the hooks become charred and blackened, so that this end of the meat requires considerable trimming before it can be placed in a marketable condition.

The foregoing economic waste is avoided according to the use of my structure, as well as the haphazard method of handling the bacon in order to achieve the desired shape thereof. The use of my structure permits a positive, controlled initial shaping of the comparatively soft and pliable pieces of meat prior to smoking and the subsequent holding of the shape during the latter process, so that the general appearance and shape of the bacon is greatly improved with consequent advantages from the standpoint of marketability.

These and further objects of my invention will be set forth in the following specification, reference being had to the accompanying drawings, and the novel means by which said objects are effectuated will be definitely pointed out in the claims.

In the drawings:

Figure 1 is a side elevation of my improved trolley showing the method of loading the same with a plurality of meat-holding baskets;

Fig. 2 is a section along the line 2—2 in Fig. 1, showing one basket in position on the trolley;

Figure 3:
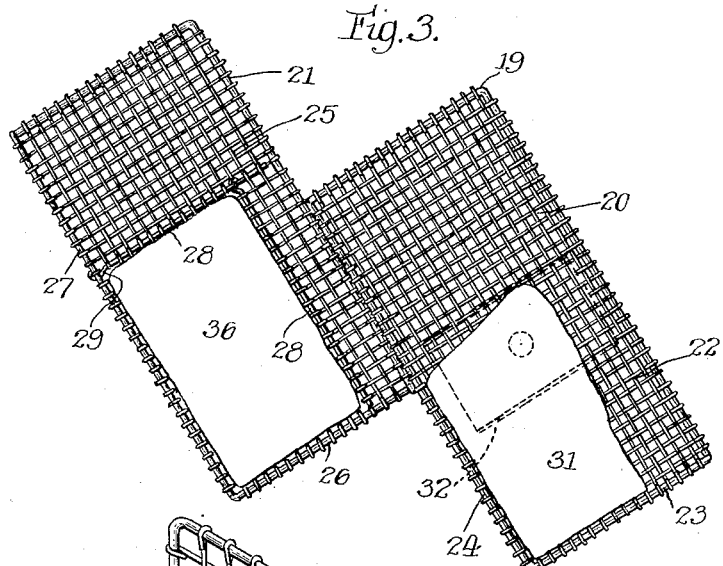
Fig. 3 is a plan view of an improved basket having a pair of meat-receiving compartments, one of the compartments being shown with a piece of bacon prior to the initial shaping and the other of said compartments showing a similar piece of meat completely shaped according to the desired form.

My improved trolley consists of a skeleton framework having the upright end bars 10 which are connected by several pairs of horizontal bars, such as 11, 12 and 13, each of said pairs being connected at the ends thereof adjacent the bars 10 by crossbars 14. In Fig. 1, only three pairs of the horizontal bars are shown, but it will be understood that as many pairs thereof may be employed as desired and it will be further noted that the bars of each pair are spaced from each other, as shown clearly in Fig. 2. The trolley frame is provided with a hanger 15 in which is revolubly carried the trolley wheels 16 which run along a rail 17. The horizontal bars 12 and 13, as well as other bars which may be positioned under the bar 13, may be provided with a plurality of notches 18. The foregoing trolley frame is now in common use in the industry and in and of itself forms no part of the present invention, but it has been utilized in a novel way in combination with the improved type of basket hereinafter described to effect an improved system of loading.

For purpose of description, the basket presently described will be denoted as being of special advantage when used in the smoking of bacon, but it will be understood that other types of meat may be employed without affecting the central thought involved. The meat basket 19 is preferably formed of wire screening or netting having any desired mesh and gauge of wire, but is preferably formed of material of this character which will stand hard usage without distortion or losing its shape. The use of wire screening, or any generally foraminous material, insures that the meat carried by the basket will be effectively subjected to the action of the heat and smoke during the smoking process.

Each basket is formed with a pair of compartments 20 and 21 which are displaced relative to each other in the direction of their length. The compartment 20 comprises a bottom 22, an upstanding end 23 and an upstanding side 24, thus leaving the opposite end and side, respectively, free for the ready application of meat to this compartment. Similarly the compartment 21 comprises a bottom 25, an upstanding end 26 and an upstanding side 27. Owing to the displacement of the compartment 21 with respect to the compartment 20, as shown clearly in Fig. 3, the end 26 of the former compartment joins with the side 24 of the latter compartment intermediate the ends of said last named side. The provision of one end and side for each compartment affords a means for quickly and easily compressing the shape of pieces of bacon placed therein according to the method which will now be described, regardless of the marginal dimensions of the pieces.

Figure 4:
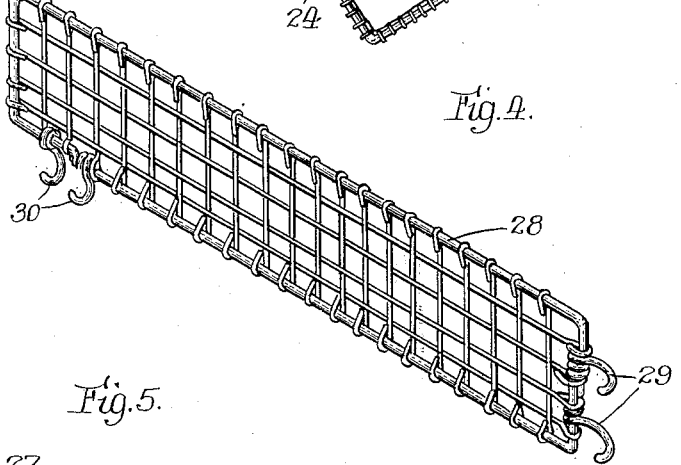
Fig. 4 is a perspective view of one of the retaining members which are used to compress the marginal edge or side of the bacon.
Figure 5:
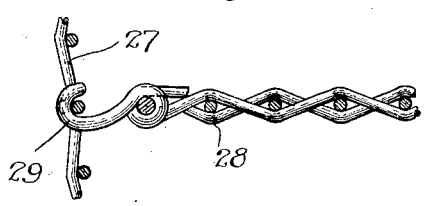
Fig. 5 is a plan view, partly in section, showing the manner in which the retaining member, shown in Fig. 4, is secured to the basket proper.
Figure 6:
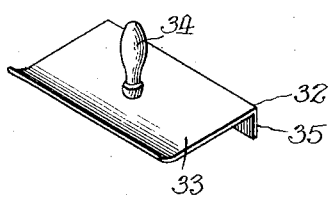
Fig. 6 is a perspective view of the hand compressing member which is utilized in initially compressing the bacon, being a means of holding the bacon in compression during the application of one of the retaining members shown in Fig. 4.

The general type of the restraining member used with my improved basket is designated by the numeral 28, as shown in Fig. 4, and this member is formed of the same material as is the basket 19. The member 28 is made with a generally rectangular shape and to one end edge thereof is secured a pair of hooks 29, with similar hooks 30 secured to a side edge thereof adjacent the opposite end of the member 28 from the hooks 29.

When a piece of bacon is first placed in one of the compartments of the basket 19, it will have the general irregular shape designated by the numeral 31 in Fig. 3. This shape is decidedly objectionable from a commercial standpoint, so that I propose to shape the piece of bacon according to the outline desired and smoke the same while in that condition. To effect this change in shape, the piece 31 is placed in the compartment 20 so that two of its marginal edges are in contact with the end and side 23 and 24, respectively. Pressure is then exerted on one of the irregular marginal edges of the bacon, that is an edge not in contact with either the end 23 or the side 24, by means of a hand compression member 32. This member includes a flat portion 33 which rests on the top surface of the bacon and is provided with a handle 34, and also with a flange portion 35 which bears directly against the irregular edge of the bacon to be compressed. The member 32 is shown dotted in Fig. 3 and slightly displaced from the side 24 for purpose of clearness. The marginal edge of the bacon having been straightened by applying pressure to the same through the member 32, a retaining member 28 of appropriate length will be hooked at one end by the hooks 29 to the side 24, pivoted on said hooks until it bears closely against the flange 35, whereupon it will be fixed in position by engaging the hooks 30 with the bottom 22 of the compartment 20. The compressing member 32 may then be removed and a similar procedure followed with respect to the other irregular marginal side of the bacon 31, thus squaring the edges of the meat as denoted by the numeral 36 in Fig. 3.

The basket 19 having been loaded in the foregoing manner, the first basket will be placed on the rails 12, preferably resting in a pair of notches 18 thereof. It will be observed, from Fig. 2, that the displaced arrangement of the compartments 20 and 21 permits a positioning of each basket 19 in a slightly canted position from the vertical, or one in which the compartment 21 is suspended substantially between the bars 12 with the major portion of the compartment 20 positioned in overhanging relation thereto and to one of the bars 12. This arrangement is somewhat economical of space in the trolley frame, but it will be understood that a regular arrangement of the baskets 20 and 21, that is one in which the compartments are not displaced with relation to each other is deemed to be within the scope of my invention.

The first basket 19 having been placed in position as above described, succeeding baskets will likewise be carried by the rails 12 in a similar manner and with each basket occupying a reclining position with respect to the preceding basket in position. This reclining, stacked relation of the baskets within one tier thereof, that is a single group of baskets supported by a pair of rails such as 12, greatly increases the capacity of the trolley frame over similar methods heretofore employed and substantially approximates in this respect the capacity of a trolley in which the pieces of bacon are suspended from hooks.

The tier of baskets having been completed on the bars 12, a similar tier will be supported on the bars 13, but with the individual baskets in an opposite, inclined direction. The effect of alternately inclining the baskets in successive tiers throughout the depth of the frame insures that the smoke and hot gases during the smoking process will pursue a sinuous course in rising upwardly through the frame, being deflected from time to time by the impervious slabs of bacon. This manner of arranging the path of the smoke and hot gases to the trolley framework provides for a more effective and intimate contact of these elements with the surfaces of the bacon than would otherwise be obtained.

While I have shown one set of elements and combinations thereof for effectuating my improved smokehouse trolley, it will be understood that the same is intended for purpose of illustration only and in nowise to restrict my structure to the exact forms and combinations shown, for many changes may be made therein without departing from the spirit of my invention.

I claim:

1. The combination of a skeleton frame, and a plurality of meat receiving, foraminous baskets carried by said frame, said baskets being arranged in a reclining, stacked relation and each basket serving as a support for the next adjacent basket.

2. The combination of a skeleton frame having spaced horizontal bars, and a plurality of foraminous, meat-receiving baskets carried by said frame in a tier, said baskets being arranged with the end basket at one end of the tier supported in an inclined position by said horizontal bars, and with successive baskets in stacked, reclining relation to said end basket, each basket serving as a support for the next adjacent basket.

3. The combination of a skeleton frame having spaced, horizontal bars, and a plurality of foraminous, meat-receiving baskets carried by said frame in a tier, each of said bskets having a pair of meat compartments, the end basket at one end of the tier being supported in an inclined position by said horizontal bars with one of said compartments carried between said horizontal bars and the other without said bars, and with successive baskets in stacked, reclining relation to said end basket, each basket serving as a support for the next adjacent basket.

4. The combination of a skeleton frame having spaced horizontal bars, and a plurality of foraminous, meat-receiving baskets carried by said frame in a tier, each of said baskets having a pair of meat compartments displaced relative to each other in the direction of the length of the basket, the end basket at one end of the tier being supported in an inclined position by said horizontal bars with one of said compartments carried between said horizontal bars and the other without said bars, and with successive baskets in stacked, reclining relation to said end basket, each basket serving as a support for the next adjacent basket.

5. The combination of a skeleton frame, and a plurality of foraminous, meat-receiving baskets carried by said frame in a tier, said baskets being arranged with the end basket at one end of the tier supported in an inclined position and with successive baskets in stacked, reclining relation to said end basket, each basket serving as a support for the next adjacent basket.

6. The combination of a skeleton frame, and a plurality of foraminous, meat-receiving baskets carried by said frame in a tier, said baskets resting on said frame in inclined positions and in contiguous relation with each other, each basket in the tier serving as a support for the next adjacent basket.

7. The combination of a frame and a plurality of foraminous, meat-receiving baskets mounted thereon in a tier, said baskets being disposed in reclining positions and mutually supporting each other.

In testimony whereof, I have subscribed my name.

ALONZO NEWTON BENN.